US012349829B2

(12) United States Patent
Sculler et al.

(10) Patent No.: US 12,349,829 B2
(45) Date of Patent: Jul. 8, 2025

(54) KITS FOR COMBINING CONSUMABLES AND METHODS OF USE THEREOF

(71) Applicant: MSZ Education Services, LLC, Boynton Beach, FL (US)

(72) Inventors: Steven J. Sculler, Boynton Beach, FL (US); Ola Gambari, New York, NY (US)

(73) Assignee: MSZ Education Services, LLC, Boynton Beach, FL (US)

( * ) Notice: Subject to any disclaimer, the term of this patent is extended or adjusted under 35 U.S.C. 154(b) by 765 days.

(21) Appl. No.: 17/541,015

(22) Filed: Dec. 2, 2021

(65) Prior Publication Data

US 2022/0175173 A1    Jun. 9, 2022

Related U.S. Application Data

(60) Provisional application No. 63/121,014, filed on Dec. 3, 2020.

(51) Int. Cl.
*A47J 31/00* (2006.01)
*G01F 19/00* (2006.01)

(52) U.S. Cl.
CPC ............. *A47J 31/002* (2013.01); *G01F 19/00* (2013.01)

(58) Field of Classification Search
CPC ................................ A47J 31/002; G01F 19/00
See application file for complete search history.

(56) References Cited

U.S. PATENT DOCUMENTS

| | | |
|---|---|---|
| 2,013,616 A | 9/1935 | Rettenmeyer |
| 2,013,617 A | 9/1935 | Werfel |
| 4,293,008 A * | 10/1981 | Coleman ................... B67D 1/08 73/427 |
| 4,388,839 A | 6/1983 | Benisti |
| 6,159,513 A | 12/2000 | Judlowe et al. |
| 6,200,015 B1 | 3/2001 | Gartz et al. |
| 8,657,604 B2 | 2/2014 | Gilchrist et al. |
| 8,829,365 B1 | 9/2014 | Wallace et al. |
| 9,759,595 B1 | 9/2017 | Morgan |

(Continued)

OTHER PUBLICATIONS

Kikkerland Mix Master Cocktail Shaker. Feb. 2015. https://web.archive.org/web/20150225121849/http://www.amazon.com/Kikkerland-Mix-Master-Cocktail-Shaker/dp/B007AJVFXK.*

(Continued)

*Primary Examiner* — Anthony J Weier

(74) *Attorney, Agent, or Firm* — Lerner David LLP

(57) ABSTRACT

A kit includes a mixing vessel having a filling opening configured to allow the mixing vessel to be filled therethrough; and a plurality of indicia disposed on the mixing vessel, wherein the plurality of indicia are positioned and spaced so as to define a plurality of parts of the mixing vessel therebetween, and wherein the plurality of indicia are sequentially labeled with dimensionless labels; and a recipe including an identification of a plurality of ingredients and sequential filling instructions for adding the plurality of ingredients of the recipe to the mixing vessel in a sequential manner, wherein each sequential filling instruction has a corresponding one of the plurality of ingredients, and wherein each sequential filling instruction indicates a labeled indicia on the mixing vessel corresponding to a fill level of contents of the mixing vessel following addition of the corresponding one of the plurality of ingredients.

21 Claims, 10 Drawing Sheets

(56) References Cited

U.S. PATENT DOCUMENTS

| | | | |
|---|---|---|---|
| 10,564,021 | B1 | 2/2020 | Morgan |
| 2005/0191398 | A1 | 9/2005 | Duffy et al. |
| 2009/0145009 | A1 | 6/2009 | Zinszer |
| 2011/0024320 | A1 | 2/2011 | Roman et al. |
| 2011/0192750 | A1 | 8/2011 | Kokin |
| 2011/0318718 | A1 | 12/2011 | Duffy, III et al. |
| 2015/0030737 | A1* | 1/2015 | Morrone ............. A47J 31/4457 426/388 |
| 2015/0056332 | A1 | 2/2015 | Gold |
| 2015/0216361 | A1 | 8/2015 | Tsui et al. |
| 2016/0015598 | A1* | 1/2016 | Provencher ............... G09F 3/10 235/494 |
| 2016/0060022 | A1 | 3/2016 | Stagl |
| 2018/0263424 | A1 | 9/2018 | Kjenner |
| 2019/0038054 | A1* | 2/2019 | Pivirotto ............ B65D 43/0214 |
| 2020/0072658 | A1 | 3/2020 | Wallace et al. |
| 2020/0405089 | A1* | 12/2020 | Constantine ............ A47J 31/02 |

OTHER PUBLICATIONS

Kikkerland Mix Master Cocktail Shaker. Aug. 2024. https://www.amazon.ca/Kikkerland-Mix-Master-Cocktail-Shaker/dp/B007AJVFXK/ref=cm_cr_arp_d_product_top?ie=UTF8&th=1.*

Husbands that Cook. 2019. https://web.archive.org/web/20190217174141/http://www.husbandsthatcook.com/2017/01/white-rabbit/.*

* cited by examiner

KITS FOR COMBINING CONSUMABLES AND METHODS OF USE THEREOF

CROSS-REFERENCE TO RELATED APPLICATION

This application is a Section 111(a) application relating to and claiming the benefit of commonly-owned, U.S. Provisional Patent Application No. 63/121,014, filed on Dec. 3, 2020 and entitled "KITS FOR COMBINING CONSUMABLES AND METHODS OF USE THEREOF," the contents of which are incorporated herein by reference in their entirety.

FIELD OF THE INVENTION

The field of invention relates to kits for combining consumables, such as mixing beverages, and methods of use of such kits. More particularly, the field of invention relates to kits including mixing vessels and instructions for use thereof.

BACKGROUND OF THE INVENTION

Various types of mixing vessels are known, including mixing vessels with measurement markings. Typically, such vessels have conventional measures, such as ounces, requiring a user to use a recipe that is properly sized to fit the mixing vessel to be used, or to scale a recipe up or down if necessary.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

SUMMARY OF THE INVENTION

Figure 1:
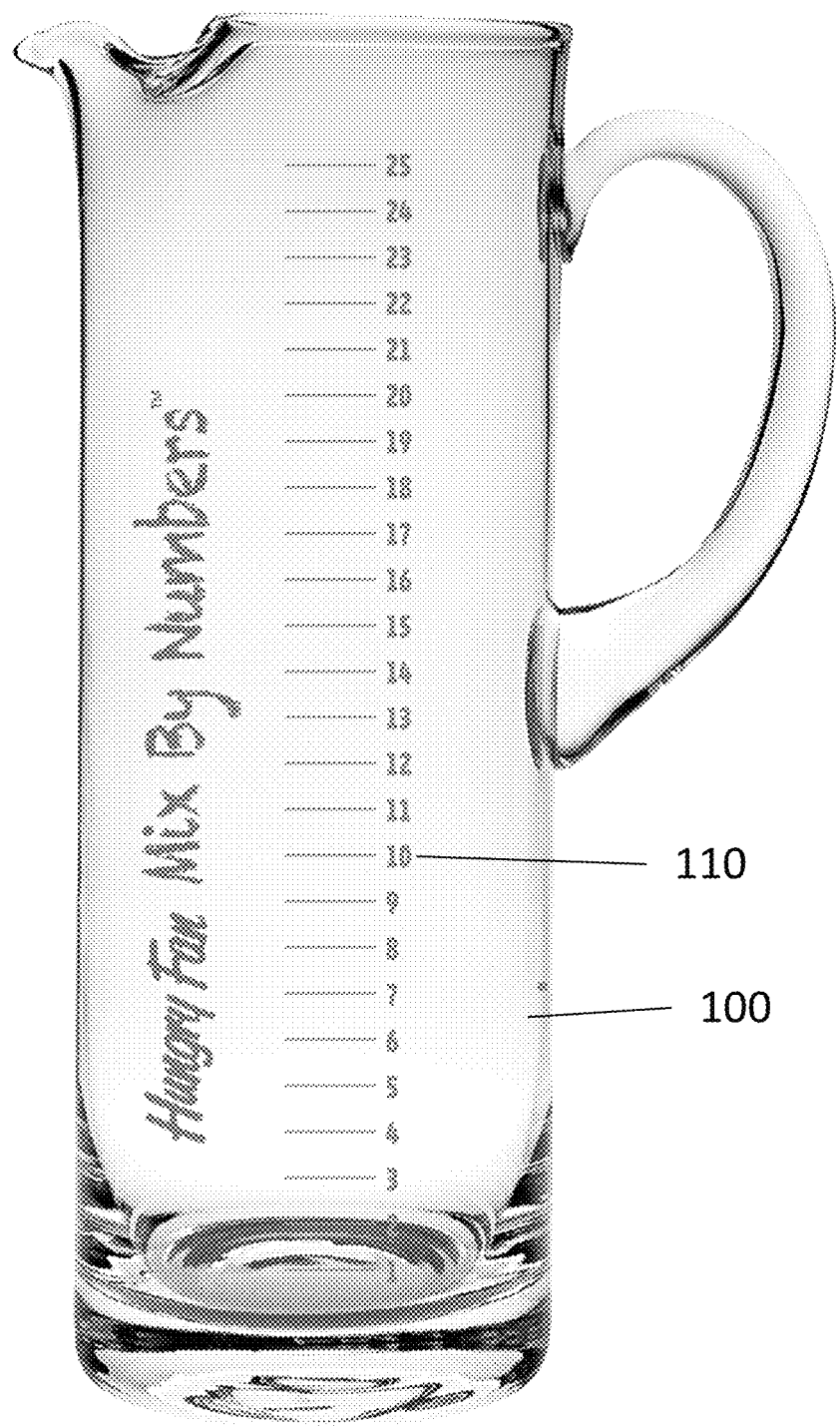
FIG. 1 shows an exemplary open-ended mixing vessel.

In an embodiment, a kit includes a mixing vessel, wherein the mixing vessel includes an opening configured to allow the mixing vessel to be filled therethrough when the vessel is oriented in a filling orientation; and a plurality of indicia disposed on the mixing vessel, wherein the plurality of indicia are positioned and spaced so as to define a plurality of equally sized parts of the mixing vessel therebetween when viewed while the vessel is oriented in the filling orientation, and wherein the plurality of indicia are sequentially labeled with dimensionless labels; and a recipe, wherein the recipe includes an identification of a plurality of ingredients and sequential filling instructions for adding a plurality of ingredients of the recipe to the mixing vessel in a sequential manner, wherein each sequential filling instruction has a corresponding one of the plurality of ingredients, and wherein each filling instruction indicates a labeled indicia on the mixing vessel corresponding to the level of the contents of the mixing vessel following addition of the corresponding one of the plurality of ingredients.

In an embodiment, a method includes providing a vessel, wherein the vessel includes an opening configured to allow the mixing vessel to be filled therethrough when the vessel is oriented in a filling orientation; and a plurality of indicia disposed on the mixing vessel, wherein the plurality of indicia are positioned and spaced so as to define a plurality of equally sized parts of the mixing vessel therebetween when viewed while the vessel is oriented in the filling orientation, and wherein the plurality of indicia are sequentially labeled with dimensionless labels; providing a recipe, wherein the recipe includes an identification of a plurality of ingredients and sequential filling instructions for adding the plurality of ingredients of the recipe to the mixing vessel in a sequential manner, wherein each sequential filling instruction has a corresponding one of the plurality of ingredients, and wherein each filling instruction indicates a labeled indicia on the mixing vessel corresponding to the level of the contents of the mixing vessel following addition of the corresponding one of the plurality of ingredients; adding an amount of a first one of the plurality of ingredients to the vessel until the vessel is filled to the labeled indicia indicated by a first one of the filling instructions that corresponds to the first one of the plurality of ingredients; and adding an amount of a second one of the plurality of ingredients to the vessel until the vessel is filled to the labeled indicia indicated by a second one of the filling instructions that corresponds to the second one of the plurality of ingredients.

In some embodiments, a kit includes a mixing vessel, wherein the mixing vessel includes: a filling opening configured to allow the mixing vessel to be filled therethrough when the mixing vessel is oriented in a filling orientation; and a plurality of indicia disposed on the mixing vessel, wherein the plurality of indicia are positioned and spaced so as to define a plurality of parts of the mixing vessel therebetween when viewed while the mixing vessel is oriented in the filling orientation, and wherein the plurality of indicia are sequentially labeled with dimensionless labels; and a recipe, wherein the recipe includes an identification of a plurality of ingredients and sequential filling instructions for adding the plurality of ingredients of the recipe to the mixing vessel in a sequential manner, wherein each sequential filling instruction has a corresponding one of the plurality of ingredients, and wherein each sequential filling instruction indicates a labeled indicia on the mixing vessel corresponding to a fill level of contents of the mixing vessel following addition of the corresponding one of the plurality of ingredients.

In some embodiments, the plurality of parts of the mixing vessel are equally sized to one another. In some embodiments, the mixing vessel includes between 2 and 200 parts.

In some embodiments, the plurality of parts of the mixing vessel includes a first plurality of the parts of the mixing vessel having a first size and a second plurality of the parts of the mixing vessel having a second size, and wherein the second size is different from the first size. In some embodiments, the first plurality of the parts of the mixing vessel includes between 2 and 200 of the parts of the mixing vessel having the first size, and wherein the second plurality of the parts of the mixing vessel includes between 2 and 200 of the parts of the mixing vessel having the second size.

In some embodiments, the mixing vessel is configured to dispense contents thereof when the mixing vessel is positioned in a dispensing orientation that is different from the filling orientation. In some embodiments, the filling opening is positioned on a top of the mixing vessel when the mixing vessel is positioned in the filling orientation, and wherein the filling opening is not positioned on a top of the mixing vessel when the mixing vessel is positioned in the dispensing orientation.

In some embodiments, the recipe is a recipe for one of a beverage, a sauce, a marinade, a spice mixture, or a powdered drink mixture.

In some embodiments, the mixing vessel is one of an open-topped bottle, a closable bottle, a pitcher, a glass, a cup, a measuring cup, or a bowl.

In some embodiments, at least one of the parts of the mixing vessel has a volume that is between 5 milliliters and 500 milliliters.

In some embodiments, the recipe is included in a reference guide comprising a plurality of recipes. In some embodiments, the reference guide comprises a computerized reference guide. In some embodiments, the reference guide comprises a physical item. In some embodiments, the physical item includes at least one blank recipe. In some embodiments, the physical item includes a material that is selected to prevent damage if the physical item becomes wet.

In some embodiments, a method includes providing a mixing vessel, wherein the mixing vessel includes: an opening configured to allow the mixing vessel to be filled therethrough when the mixing vessel is oriented in a filling orientation; and a plurality of indicia disposed on the mixing vessel, wherein the plurality of indicia are positioned and spaced so as to define a plurality of parts of the mixing vessel therebetween when viewed while the mixing vessel is oriented in the filling orientation, and wherein the plurality of indicia are sequentially labeled with dimensionless labels; providing a recipe, wherein the recipe includes an identification of a plurality of ingredients and sequential filling instructions for adding the plurality of ingredients of the recipe to the mixing vessel in a sequential manner, wherein each sequential filling instruction has a corresponding one of the plurality of ingredients, and wherein each filling instruction indicates a labeled indicia on the mixing vessel corresponding to a fill level of contents of the mixing vessel following addition of the corresponding one of the plurality of ingredients; orienting the mixing vessel in the filling orientation; adding an amount of a first one of the plurality of ingredients to the mixing vessel until the mixing vessel is filled to the labeled indicia indicated by a first one of the sequential filling instructions that corresponds to the first one of the plurality of ingredients; and adding an amount of a second one of the plurality of ingredients to the mixing vessel until the mixing vessel is filled to the labeled indicia indicated by a second one of the sequential filling instructions that corresponds to the second one of the plurality of ingredients.

In some embodiments, the method also includes orienting the mixing vessel in a dispensing orientation that is different from the filling orientation; and dispensing contents of the mixing vessel from the mixing vessel in the dispensing orientation.

In some embodiments, at least one of the plurality of ingredients is a liquid. In some embodiments, at least one of the plurality of ingredients is a solid. In some embodiments, the solid is ice. In some embodiments, at least one of the plurality of ingredients is a powder.

DETAILED DESCRIPTION OF THE INVENTION

The exemplary embodiments described herein relate to kits for combining consumables, such as, for example, beverage mixing kits that allow a user to formulate a variety of predetermined beverage recipes into one or more differently sized vessels without the need for the user to perform scaling of ingredients. In some embodiments, a kit for combining consumables includes at least one vessel and recipe system including at least one recipe. In some embodiments, each vessel has an opening into which ingredients can be poured and volume indicia positioned on the vessel. In some embodiments, the volume indicia are permanently positioned on the vessel (e.g., printed on the vessel, etched into a surface of the vessel, etc.). In some embodiments, the volume indicia are temporarily positioned on the vessel (e.g., printed on an accessory that is removably joined to the vessel). In some embodiments, the volume indicia correlate to matching indicia in the at least one recipe. In some embodiments, the vessel includes a closure element configured to close the vessel (e.g., for storage or transportation). In some embodiments, the vessel is open for use in dispensing contents into a vessel of a different size (e.g., smaller vessels).

In some embodiments, recipes forming part of an exemplary kit for combining consumables are based on measurement of quantities of ingredients in dimensionless "parts". For example, in some embodiments, all recipes have a total of 25 parts and the vessel has 25 evenly marked increments that correlate to the 25 parts in the recipe. The ingredients may constitute the recipe in equal quantities (for example, a recipe includes 5 parts of each of five ingredients, totaling 25 parts), or unequal quantities (for example, a recipe includes 15 parts of a first ingredient and 10 parts of a second ingredient, totaling 25 parts), as long as the total number of parts is correlated between the recipe and vessel. In some embodiments, the marking levels are denoted by numbers (e.g., numbered sequentially from 1 to 25 or from 1 to another suitable number). In some embodiments, the marking levels are denoted by letters (e.g., lettered sequentially from A to Y to define 25 parts, sequentially from A to J to define 10 parts, etc.). In some embodiments, the marking levels are indicated by another type of indicia that provides for correlation between the vessel and a recipe.

In some embodiments, the measurements from a recipe are not equal to the total number of parts in the vessel. For example, the recipe has a specified number of parts and the vessel has an amount of marked increments at least as numerous. For example, in some embodiments, a vessel includes 25 parts, and a recipe only fills up to 20 of the 25 parts, only fills up to 8 of the 25 parts, etc. Accordingly, it should be understood the vessel and recipe have correlating numbers, but the recipe does not have to fill all parts in the vessel if the recipe does not call for such filling.

In some embodiments, the exemplary system provides a way to accurately formulate a consumable independent of the size of the container. In some embodiments, the indicia of an exemplary mixing vessel are spaced apart from one another so as to define parts of the mixing vessel that correspond to parts of a recipe as will be described hereinafter. For example, in an exemplary embodiment in which the system is formulated around 25 parts, an exemplary vessel could be a 1-liter vessel having indicia measuring 25 parts correlating to a recipe including 25 parts, could be a 2-liter vessel having indicia measuring 25 parts correlating to a recipe including 25 parts, could be a 0.5-liter vessel having indicia measuring 25 parts correlating to a recipe including 25 parts, or could be any other sized vessel having indicia measuring 25 parts correlating to a recipe including 25 parts. In some embodiments, all of the parts within a vessel are equally sized to one another (e.g., in a vessel including 25 parts, each of the 25 parts denotes a volume that is the same size as all others of the 25 parts). In some embodiments, the parts within a single vessel are not equally sized to one another (e.g., a vessel includes 10 parts denoting regions having a first volume and 5 parts denoting regions having a second volume that is different than the first volume), with the proportions among parts remaining constant across vessels having different total sizes. It will be apparent to those of skill in the art that, for each such differently sized vessel, the size of each individual part would vary depending on the size of the vessel. For example, in an exemplary mixing system including mixing vessels having parts that are uniformly sized, vessel sizes and part sizes may be as follows:

| Vessel Size | Number of Parts | Part Size | Total volume of parts |
|---|---|---|---|
| 1 liter | 25 | 40 milliliters | 1 liter |
| 2 liters | 25 | 80 milliliters | 2 liters |
| 0.5 liters | 25 | 20 milliliters | 0.5 liters |

In some embodiments, an exemplary mixing vessel has a volume measured in United States Customary System ("USCS") units (e.g., ounces, pints, quarts, etc.). In some embodiments, an exemplary mixing vessel having a volume measured in USCS units has a volume that is between one ounce and one pint. In some embodiments, an exemplary mixing vessel having a volume measured in USCS units has a volume that is between one ounce and one quart. In some embodiments, an exemplary mixing vessel having a volume measured in USCS units has a volume that is between one ounce and one gallon. In some embodiments, an exemplary mixing vessel having a volume measured in USCS units has a volume that is between one ounce and ten gallons. In some embodiments, an exemplary mixing vessel having a volume measured in USCS units has a volume that is between one pint and one quart. In some embodiments, an exemplary mixing vessel having a volume measured in USCS units has a volume that is between one pint and one gallon. In some embodiments, an exemplary mixing vessel having a volume measured in USCS units has a volume that is between one pint and ten gallons. In some embodiments, an exemplary mixing vessel having a volume measured in USCS units has a volume that is between one quart and one gallon. In some embodiments, an exemplary mixing vessel having a volume measured in USCS units has a volume that is between one quart and ten gallons. In some embodiments, an exemplary mixing vessel having a volume measured in USCS units has a volume that is between one gallon and ten gallons.

In some embodiments, an exemplary mixing vessel has a volume measured in metric units. In some embodiments, an exemplary mixing vessel having a volume measured in metric units has a volume that is between 10 milliliters and 0.5 liter. In some embodiments, an exemplary mixing vessel having a volume measured in metric units has a volume that is between 10 milliliters and one liter. In some embodiments, an exemplary mixing vessel having a volume measured in metric units has a volume that is between 10 milliliters and 5 liters. In some embodiments, an exemplary mixing vessel having a volume measured in metric units has a volume that is between 10 milliliters and 10 liters. In some embodiments, an exemplary mixing vessel having a volume measured in metric units has a volume that is between 10 milliliters and 50 liters. In some embodiments, an exemplary mixing vessel having a volume measured in metric units has a volume that is between 0.5 liter and one liter. In some embodiments, an exemplary mixing vessel having a volume measured in metric units has a volume that is between 0.5 liters and 5 liters. In some embodiments, an exemplary mixing vessel having a volume measured in metric units has a volume that is between 0.5 liters and 10 liters. In some embodiments, an exemplary mixing vessel having a volume measured in metric units has a volume that is between 0.5 liter and 50 liters. In some embodiments, an exemplary mixing vessel having a volume measured in metric units has a volume that is between one liter and 5 liters. In some embodiments, an exemplary mixing vessel having a volume measured in metric units has a volume that is between one liter and 10 liters. In some embodiments, an exemplary mixing vessel having a volume measured in metric units has a volume that is between one liter and 50 liters. In some embodiments, an exemplary mixing vessel having a volume measured in metric units has a volume that is between 5 liters and 10 liters. In some embodiments, an exemplary mixing vessel having a volume measured in metric units has a volume that is between 5 liters and 50 liters. In some embodiments, an exemplary mixing vessel having a volume measured in metric units has a volume that is between 10 liters and 50 liters.

In some embodiments, an exemplary mixing system includes a mixing vessel having parts that are not uniformly sized. In an exemplary mixing system including mixing vessels having parts that are not uniformly sized, vessel sizes and part sizes may be as follows:

| Vessel size | Quantity of first parts | Size of first parts | Total of second parts | Quantity of second parts | Size of second parts | Total of second parts |
|---|---|---|---|---|---|---|
| 1 liter | 10 | 80 mL | 800 mL | 5 | 40 mL | 200 mL |
| 2 liters | 10 | 160 mL | 1600 mL | 5 | 80 mL | 400 mL |
| 0.5 liter | 10 | 40 mL | 400 mL | 5 | 20 mL | 100 mL |

The examples in the table above provide part sizes and quantities for mixing vessels that have non-uniformly sized parts of two different sizes. However, it will be apparent to those of skill in the art that other exemplary mixing vessels may have non-uniformly sized parts of three different sizes, of four different sizes, of five different sizes, etc. In some embodiments, a mixing vessel having non-uniformly sized parts includes larger sized parts thereof positioned at a bottom of the mixing vessel when the mixing vessel is positioned in a filling orientation, such that ingredients to be measured using larger parts are placed into the mixing vessel before ingredients to be measured using smaller parts. In some embodiments, a mixing vessel having non-uniformly sized parts includes smaller sized parts thereof positioned at a bottom of the mixing vessel when the mixing vessel is positioned in a filling orientation, such that ingredients to be measured using smaller parts are placed into the mixing vessel before ingredients to be measured using larger parts.

In some embodiments, the vessel is an open-ended vessel suitable for dispensing. FIG. 1 illustrates an exemplary open-ended vessel 100 including indicia 110 as described above.

Figure 2:
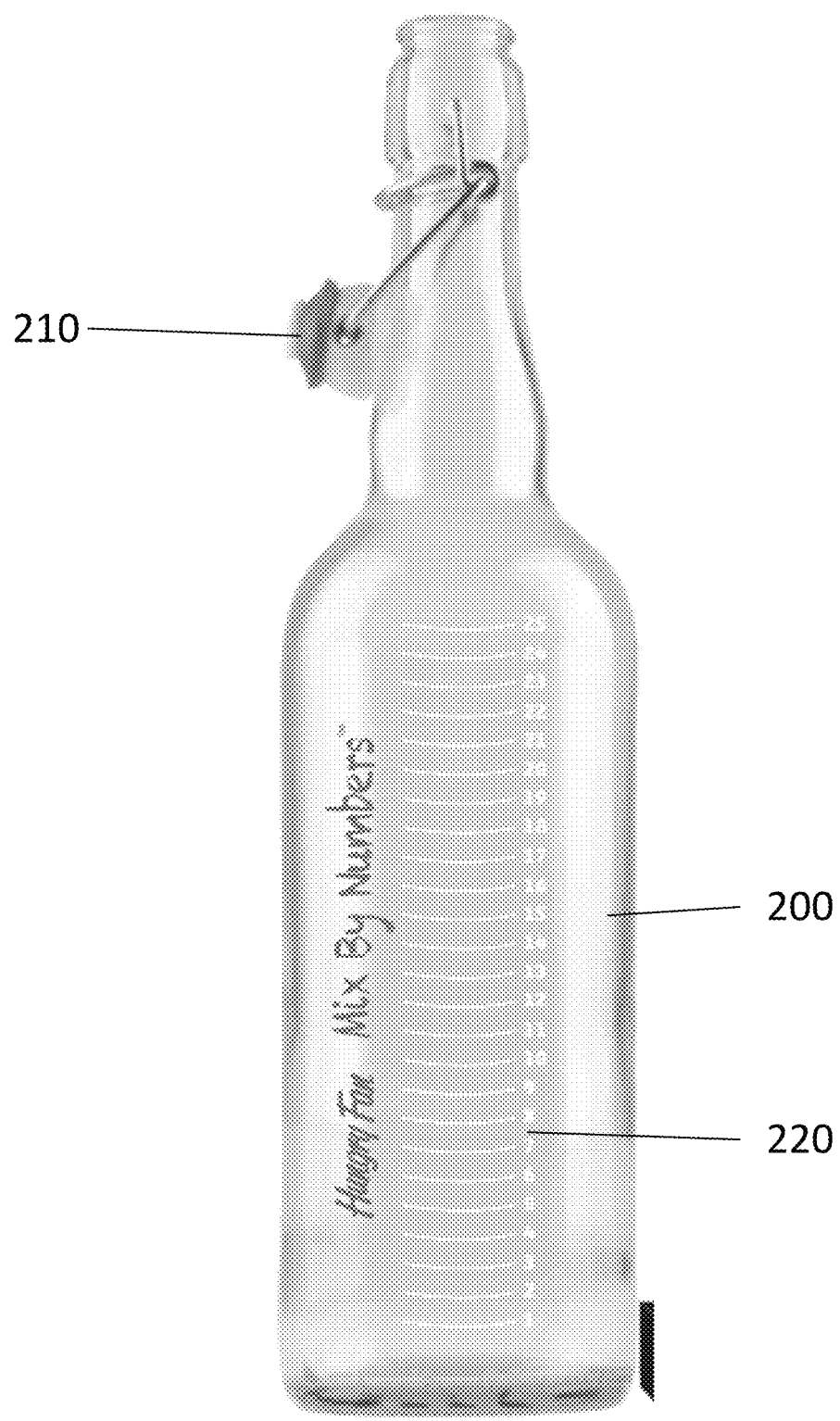
FIG. 2 shows an exemplary closable mixing vessel.

In some embodiments, the open-ended vessel is a pitcher, a glass, a cup, a measuring cup, a bowl, or other similar container. Such a container or vessel may be constructed of one or more parts (e.g., single or double-walled, etc.) and of one or more materials (e.g., acrylic, glass, rubber, etc.). In some embodiments, the vessel is a closable vessel suitable for leak prevention, storage and/or transportation and subsequent dispensing. In some embodiments, the closable vessel is a closable bottle (e.g., a bottle with a swing top, a screw top, etc.). FIG. 2 illustrates an exemplary closable vessel 200 including a closure 210 and indicia 220 as described above.

Figure 3:
FIG. 3 shows an exemplary mixing vessel having more than one opening.

In some embodiments, the vessel includes more than one opening. In some embodiments, a vessel including more than one opening includes a first opening that is configured for use for filling the vessel, e.g., a filling opening. In some embodiments, the filling opening is selectively openable and closable by a user (e.g., using a screw cap, a snap-fit cap, or other type of closure mechanism that is known in the art to be suitable for closing vessels). In some embodiments, a vessel including more than one opening includes a second opening that is configured for dispensing the consumable, such as a beverage, that is contained in the vessel (e.g., a spigot, a manual or powered pumping device, or another type of dispensing mechanism that is known in the art to be suitable for dispensing from vessels). In some embodiments, the indicia are positioned to facilitate legibility when the vessel is positioned so as to fill the vessel via the first opening. FIG. 3 illustrates an exemplary vessel 300 including more than one opening 310, 320, and including indicia 330 as described above.

Figure 4A:
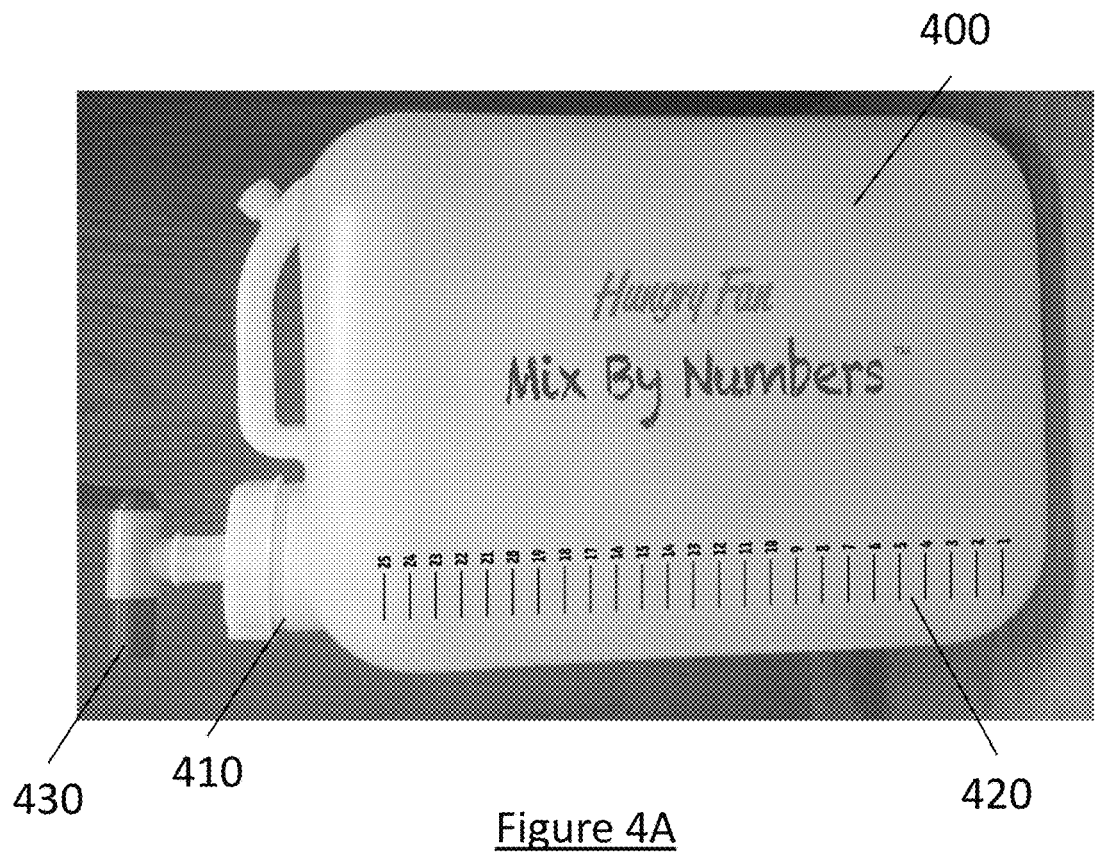
FIG. 4A shows an exemplary mixing vessel having more than one opening, including a filling opening that is positioned on a side of the vessel when the vessel is in a dispensing orientation, the exemplary mixing vessel being shown in a dispensing orientation.
Figure 4B:
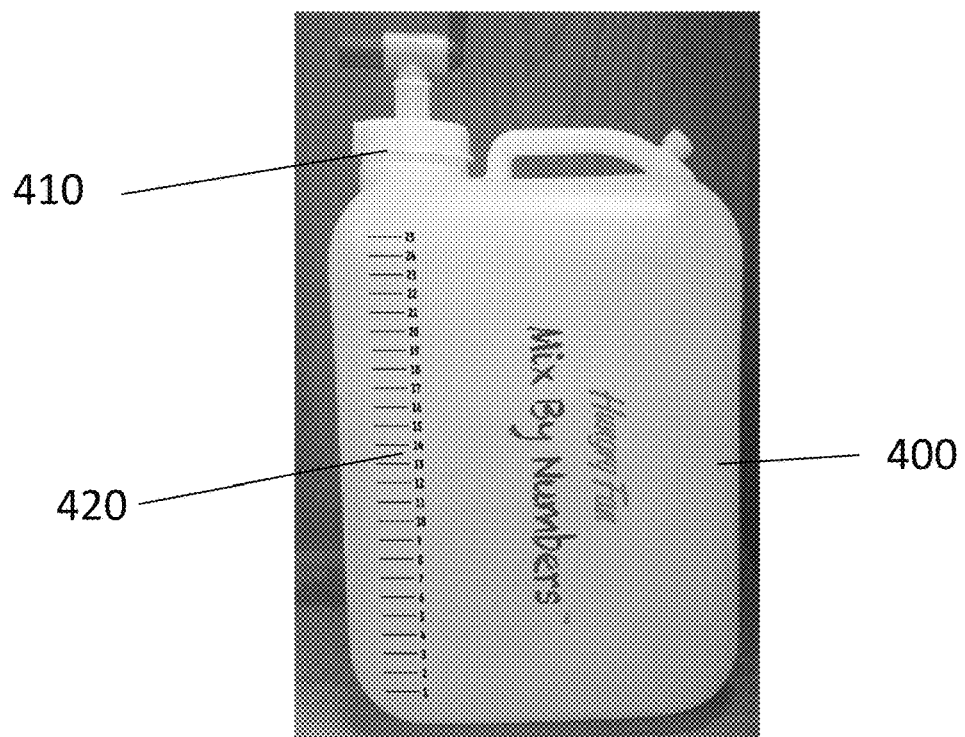
FIG. 4B shows the exemplary mixing vessel of FIG. 4A in a filling orientation.

In some embodiments, the vessel includes a filling opening that is not located on the top of the vessel when the vessel is oriented in a dispensing orientation. For example, in some embodiments, the filling opening is located on a side of the vessel when the vessel is oriented in a dispensing orientation. In some embodiments, the filling opening is located on the bottom of the vessel when the vessel is oriented in a dispensing orientation. In some such embodiments, the indicia are oriented so as to be legible when the vessel is oriented in the filling orientation. In some embodiments, a vessel includes a single opening that is configured to be used as a filling opening when the vessel is oriented in the filling orientation, and to be used as a dispensing opening when the vessel is oriented in the dispensing orientation. FIGS. 4A and 4B illustrate an exemplary vessel 400 including an opening 410 that is positioned on a side of the vessel 400 when the vessel 400 is oriented in a dispensing orientation and is positioned on a top of the vessel 400 when the vessel 400 is positioned in the filling orientation, as well as indicia 420 as described above. The vessel 400 includes a dispensing mechanism 430 that is removably positioned in the opening 410 so as to allow the vessel 400 to be filled through the opening 410 when the dispensing mechanism 430 is removed from the opening 410 and the vessel 400 is oriented in the filling orientation, or to allow contents of the vessel 400 to be dispensed using the dispensing mechanism 430 when the dispensing mechanism 430 is positioned in the opening 410 and the vessel 400 is oriented in the dispensing orientation. FIG. 4A shows the vessel 400 in a dispensing orientation, in which the opening 410 is positioned on a side of the vessel 400 and the dispensing mechanism 430 is positioned in the opening 410. FIG. 4B shows the vessel 400 in a filling orientation, in which the opening 410 is positioned on a top of the vessel 400, and in which the indicia 420 are oriented so as to be legible by a user. In the view shown in FIG. 4B, the dispensing mechanism 430 is positioned in the opening 410, but it will be apparent to those of skill in the art that the dispensing mechanism 430 may be removed in order to allow the vessel to be filled through the opening 410.

In some embodiments, a kit for combining consumables includes one or more recipes. In some embodiments, a kit for combining consumables includes one or more recipes provided in the form of individual recipe items (e.g., individual pages, individual cards, etc.). In some embodiments, a kit for combining consumables includes one or more recipes provided in the form of a reference guide containing the recipes. In some embodiments, the reference guide includes a physical item. In some embodiments, the physical item includes a collection of physical pages that can be selectively bound or unbound by a user (e.g., using a ring binder). In some embodiments, the physical item includes a book containing the recipes (e.g., with one recipe on each page of a book). In some embodiments, the reference guide includes a computerized reference guide. In some embodiments, the computerized reference guide includes one or more recipes embodied in a data file suitable for display by a computing device, such as in a Portable Document Format (PDF) file, a Microsoft Word Document (DOC) file, or another file suitable for view by a software program. In some embodiments, the computerized reference guide includes a software application (or "app") executable by a computing device, a mobile computing device, etc. In some embodiments, a recipe is provided on a physical medium (e.g., on a page of a book) including in the form of a visual representation of the recipe that is suitably scaled so as to be equal in height to the indicia marked on one or more corresponding vessels, thereby to provide a visual alignment therebetween.

In some embodiments, a kit for combining consumables includes more than one mixing vessel. In some embodiments of a kit for mixing consumables having more than one mixing vessel includes at least one mixing vessel of a first size and at least one mixing vessel of a second size. For example, in some embodiments, a kit includes a first mixing vessel that is one pint and a second mixing vessel that is one quart. In some embodiments, a kit includes more than one first mixing vessel (e.g., four mixing vessels) that are each one pint and a second mixing vessel that is one gallon. In some embodiments, a kit includes a first mixing vessel that is 0.5 liter and a second mixing vessel that is 2 liters. It will be apparent to those of skill in the art that these are only exemplary and that different embodiments of kits may include combinations of mixing vessels of the sizes listed herein or of any other size without departing from the concepts embodied in the exemplary embodiments described herein. Additionally, in some embodiments, a kit for combining consumables having more than one mixing vessel includes more than one mixing vessel of a first size.

Figure 5:
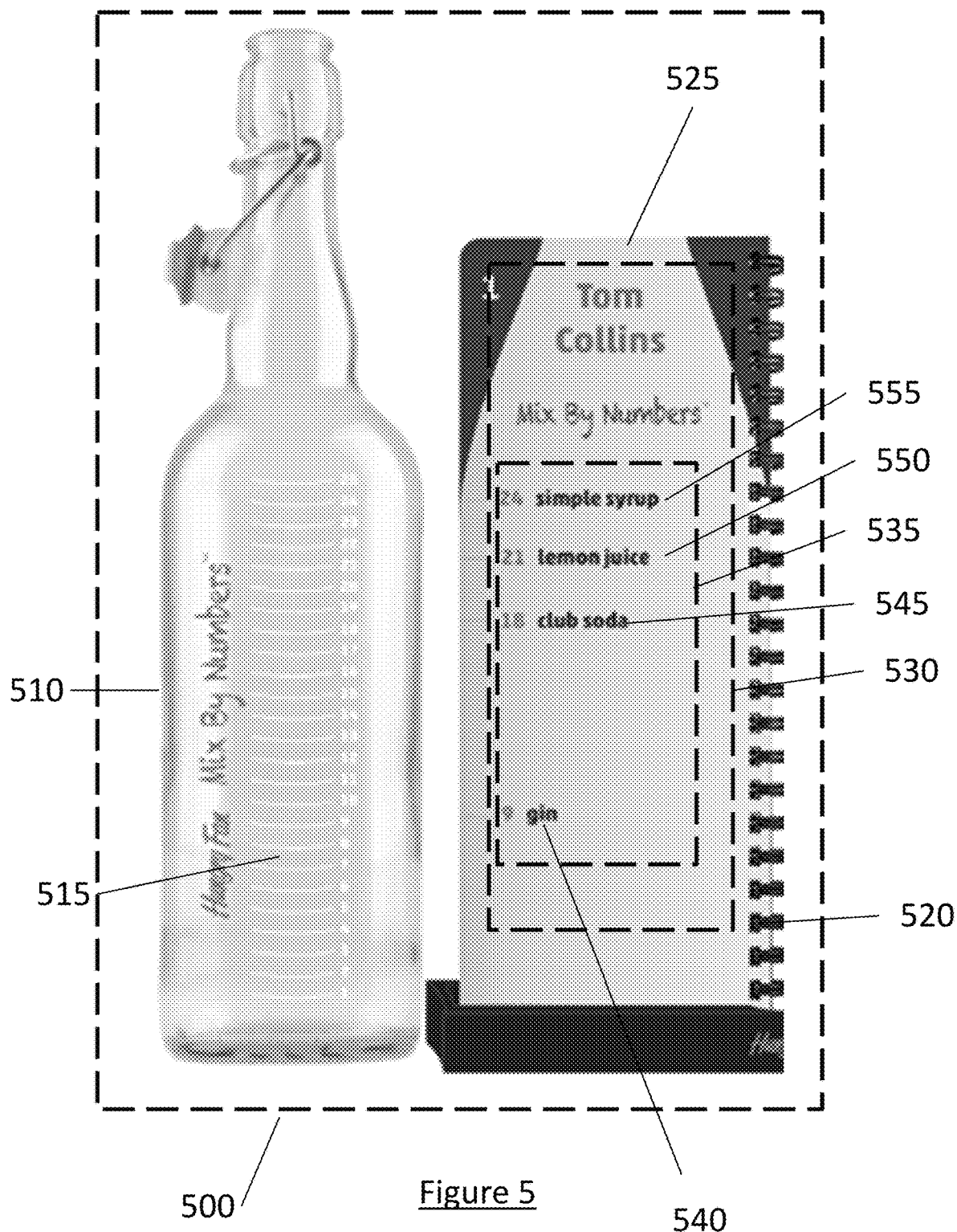
FIG. 5 shows an exemplary beverage mixing system.

FIG. 5 illustrates elements of an exemplary kit 500 including a vessel 510 and a book 520 including one or more recipes. The vessel 510 includes indicia 515 disposed thereon and labeled sequentially to define dimensionless "parts" as described above. In the embodiment shown in FIG. 5, the vessel 510 is a swing-top bottle, but it will be apparent to those of skill in the art that other types of vessels are also possible, as described herein. In the embodiment, shown in FIG. 5, the indicia 515 are printed on the vessel 510, but it will be apparent to those of skill in the art that other manners of positioning the indicia 515 on the vessel 510 are also possible, as described herein. In the embodiment shown in FIG. 5, the indicia 515 includes a sequential set of numbers from 1 to 25, but it will be apparent to those of skill in the art that the indicia 515 may include a different sequential set of numbers (e.g., from 1 to 10, from 1 to 20, from 1 to 30, or any other set of numbers) or a different set of indicia (e.g., letters from A to Y, etc.), as described herein.

Continuing to refer to FIG. 5, the book 520 includes a page 525 including a recipe 530. Though FIG. 5 only shows one page 525 of the book 520, it will be apparent to those of skill in the art that a book 520 can include any number of the pages 525. In some embodiments, the pages are made from or otherwise include a suitable material (e.g., a plastic material, a plastic-coated paper, a material made from non-woven fibers such as the flashspun nonwoven HDPE fiber material commercialized by DuPont de Nemours, Inc. of Wilmington, Delaware under the trade name TYVEK, etc.) so as to prevent damage in the event that the pages become wet. In some embodiments, the recipe 530 includes indicia 535 showing a quantity of dimensionless "parts" corresponding to the "parts" denoted by the indicia 515 of the vessel 510. In some embodiments, the indicia 535 include a plurality of ingredient-specific ones of the indicia 535 denoting amounts of a corresponding plurality of ingredients to be added to the vessel 510 to prepare the recipe 530. In some embodiments, each one of the indicia 535 indicates a corresponding one of the indicia 515 denoting a fill level of the vessel 510 after the ingredient corresponding to that one of the indicia 535 has been added to the vessel 510. For example, in the embodiment shown in FIG. 5, the plurality of the indicia 535 includes a first indicia 540 corresponding to a first ingredient, a second indicia 545 corresponding to a second ingredient, a third indicia 550 corresponding to a third ingredient, and a fourth indicia 555 corresponding to a fourth ingredient. It will be apparent to those of skill in the art that the inclusion in FIG. 5 of four of the indicia 535 is only exemplary and that other recipes may have any other number of ingredients. In some embodiments, the indicia 535 of the recipe 530 are positioned and scaled so as to appear equal in height to the indicia 515 of the vessel 510, thereby to provide visual alignment between the indicia 535 and the indicia 515 when filling the vessel 510 to produce the recipe 530.

In some embodiments, the ingredients of a recipe forming part of an exemplary beverage mixing kit include one or more liquids. In some embodiments, the ingredients of a recipe include one or more powders (e.g., sugar, salt, powdered lemon juice, etc.). In some embodiments, the ingredients of a recipe include ice or another solid that can be measured volumetrically by sight in the manner described herein.

In some embodiments, in addition to including ingredients that are measured using the marked indicia of a mixing vessel, a recipe also includes one or more additional ingredient that is added to the mixing vessel without reference to the marked indicia of the mixing vessel. For example, in some embodiments, a recipe (e.g., a beverage recipe) includes a smaller amount of a powder ingredient (e.g., a pinch of salt, an herb, or a spice) or a solid ingredient (e.g., a piece of a fruit or other solid ingredient).

Although the exemplary embodiments described herein refer to a kit for mixing beverages, it will be apparent to those of skill in the art that the principles embodied by the exemplary beverage mixing kits are also applicable for kits for mixing other fluid mixtures, e.g., sauces, dressings, marinades, or other fluids used in food preparation or directly for consumption. In some embodiments, a fluid mixture is made from a combination of liquids and solids. In some embodiments, a solid used in a fluid mixture is ice, a powder, granules, a solid block, one or more pieces of fruit, one or more pieces of a vegetable, etc. In some embodiments, a mixture prepared using the exemplary embodiments is a powder mixture. In some embodiments, a powder mixture is a spice mix for cooking, a mixture of powdered drink ingredients, a non-fluid mixture of ingredients to be used in combination with other mixtures, or another mixture to be used in food or non-food products.

In some embodiments, an exemplary kit is suitable for use in a home setting. In some embodiments, an exemplary kit is suitable for use in a commercial food service setting (e.g., provides for the mixture of larger batches, uses heavy-duty materials, etc.).

Figure 6:
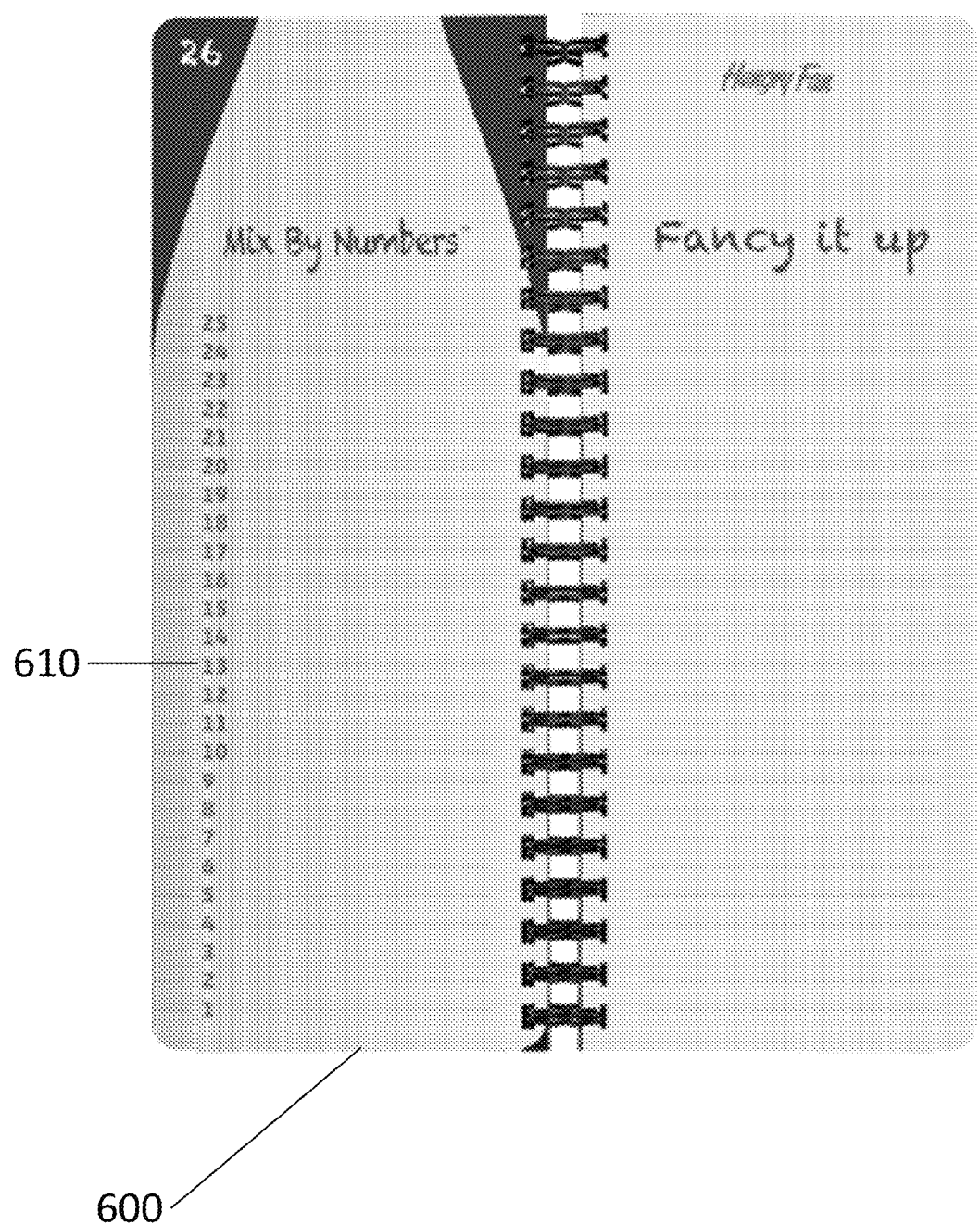
FIG. 6 shows an exemplary recipe template.

In some embodiments, an exemplary beverage mixing kit provides a user with the capability to create the user's own recipes. For example, with reference to the kit 500 shown in FIG. 5, an exemplary book 520 may include one or more user-fillable blank recipe templates in addition to one or more pages such as the page 525 showing a provided recipe 530. FIG. 6 shows an exemplary template 600 including blank indicia 610. In some embodiments, a recipe to be used with the exemplary template 600 may be produced by manually scaling an existing recipe into "parts." For example, a recipe that includes one ounce of a first ingredient and four ounces of a second ingredient (i.e., a 1:4 ratio of the first ingredient to the second ingredient) may be scaled to five parts of the first ingredient and twenty parts of the second ingredient (i.e., the same 1:4 ratio of the first ingredient to the second ingredient, but represented in dimensionless "parts"). In some embodiments, a recipe to be used with the exemplary template 600 may be produced algorithmically, e.g., by a computer program running on a user device or remotely (e.g., as a "cloud" service).

Figure 7:
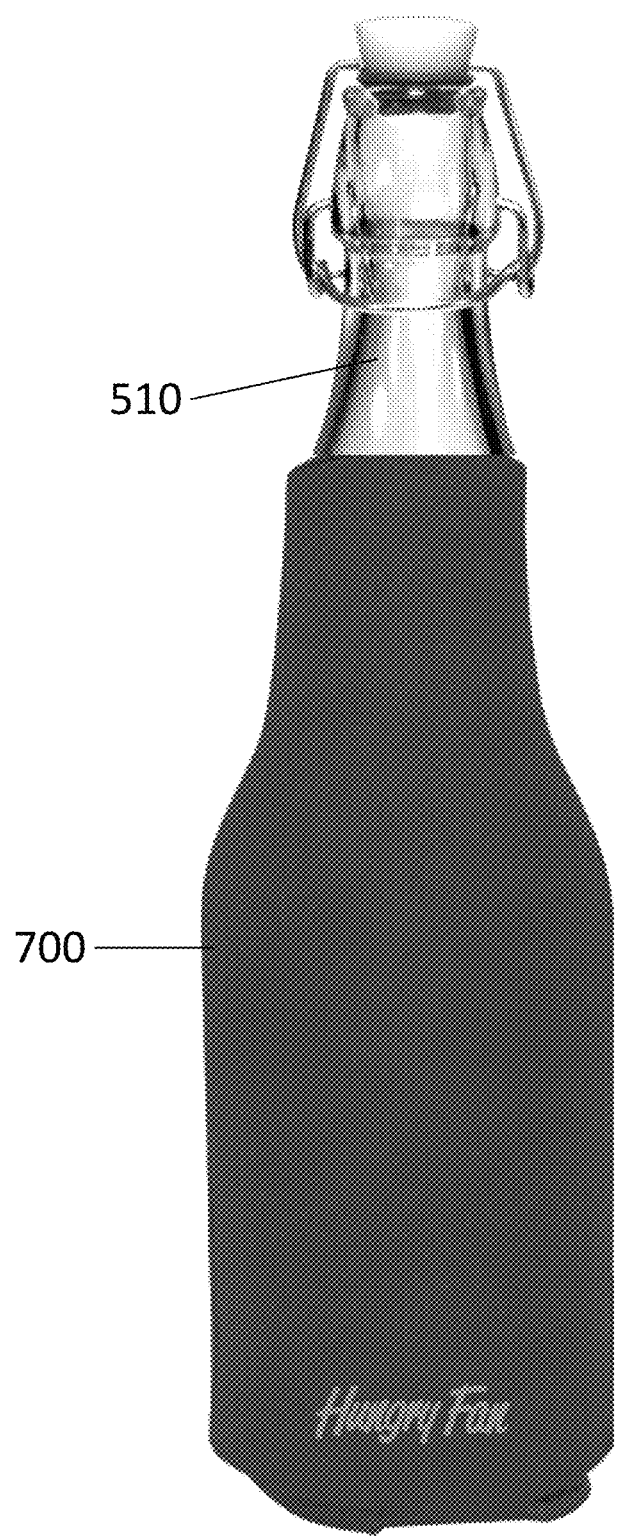
FIG. 7 shows an exemplary sleeve for a mixing vessel.

In some embodiments, the exemplary kit 500 includes a sleeve or jacket configured to be placed over the vessel 510 so as to partially or completely cover the vessel 510. FIG. 7 shows an exemplary sleeve 700. In some embodiments, the exemplary sleeve 700 obscures the indicia 515. In some embodiments, the exemplary sleeve 700 provides thermal insulation to maintain temperature of a beverage in the vessel 510. In some embodiments, the exemplary sleeve 700 provides an aesthetically pleasing appearance. This covering could also contain the name of the formulation or a means for attaching the identification of the mixture.

In some embodiments, an exemplary kit such as the kit 500 can be used to make multiple vessels of more than one formulation (e.g., a first one of the vessel 510 containing a first beverage and a second one of the vessel 510 containing a second beverage). In some embodiments, to prevent confusion between formulations, the vessel 510 includes a labeling part showing the name of a formulation contained therein. In some embodiments, the labeling part is configured to attach to the vessel and includes the name of a formulation. In some embodiments, the labeling part is configured to attach to the vessel and provides for interchangeable labels to be placed therein or thereon (e.g., includes a surface that can be written on, includes a transparent pocket into which a label can be inserted, etc.).

Figure 8:
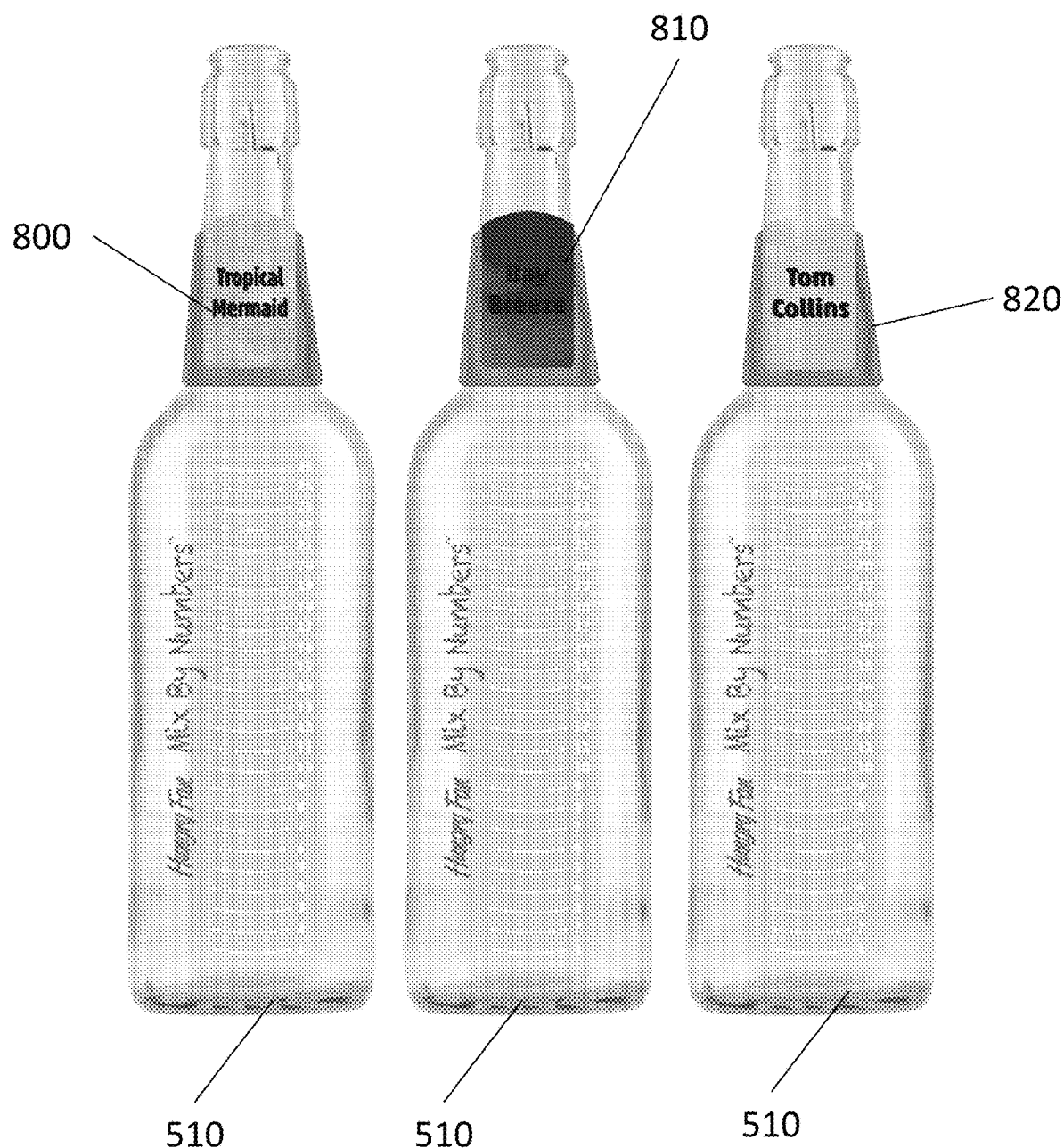
FIG. 8 shows exemplary neck rings for labeling a mixing vessel.

FIG. 8 shows exemplary labeling parts that are neck rings 800, 810, 820 configured to be positioned over the neck of a bottle, as positioned on ones of the vessel 510. In some embodiments, exemplary neck rings such as the neck rings 800, 810, 820 include labels printed thereon. In some embodiments, exemplary neck rings such as the neck rings 800, 810, 820 include slots or other receptacles configured to receive labels therein. In some embodiments, exemplary neck rings such as the neck rings 800, 810, 820 are translucent so as to enable a beverage within the vessel 510 to be viewed.

Figure 9:
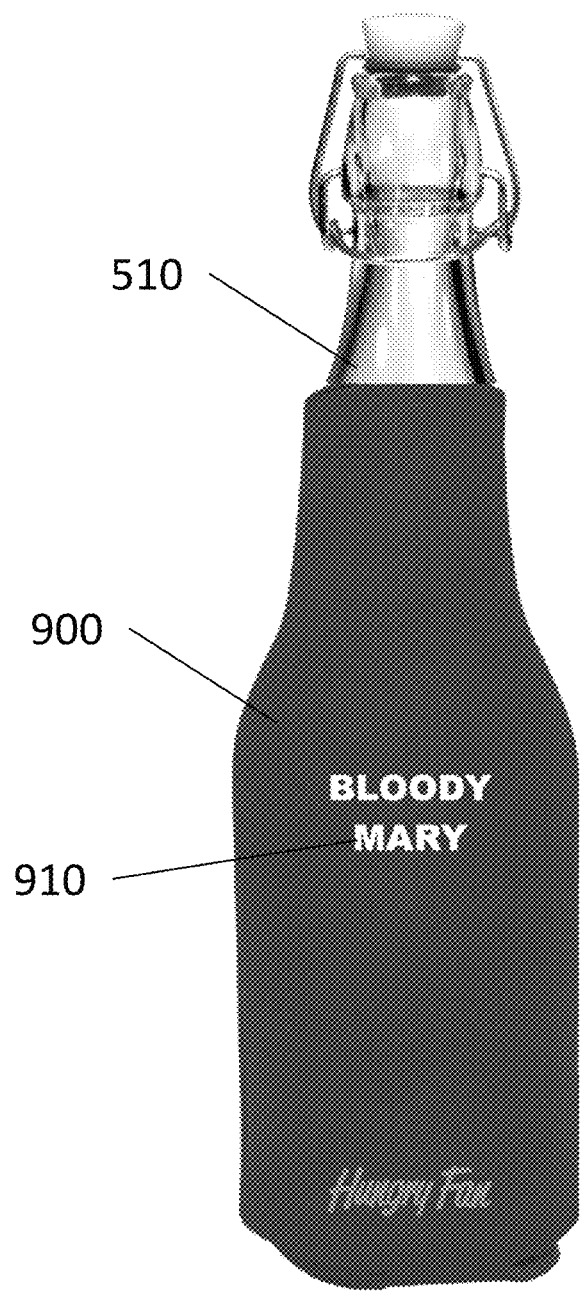
FIG. 9 shows an exemplary labeled sleeve for a mixing vessel.

FIG. 9 shows an exemplary labeling part that is a sleeve 900. In some embodiments, the sleeve 900 is substantially similar to the sleeve 700 described above with reference to FIG. 7 and additionally includes a label 910 describing contents of the vessel 510.

Figures 10A, 10B:
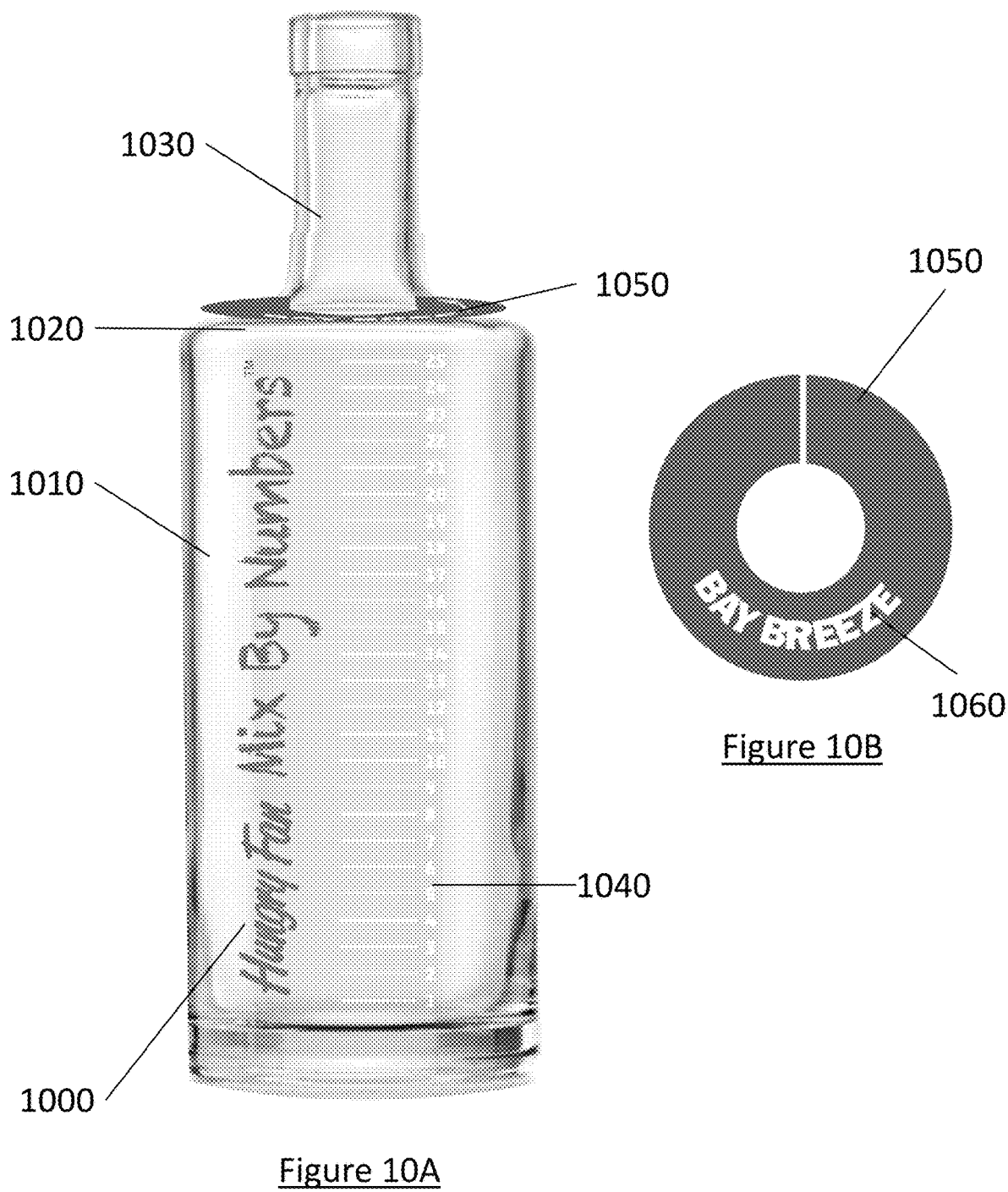
FIG. 10A shows an exemplary mixing vessel having a cylindrical body together with an exemplary labeled disc.
FIG. 10B shows a top view of the exemplary labeled disc shown in FIG. 10A.

In some embodiments, the mixing vessel is a generally cylindrical bottle. In some embodiments, a cylindrical bottle provides a flat or continuously curved surface onto which indicia can be printed or attached, without requiring any special printing processes. FIG. 10A shows an exemplary vessel 1000 that is a bottle having a cylindrical body 1010, a shoulder 1020, and a neck 1030. In some embodiments, the cylindrical body 1010 provides a continuously curved surface onto which indicia can be printed or attached. In the embodiment shown in FIG. 10A, the vessel 1000 includes indicia 1040 printed thereon. In some embodiments, a mixing system including the vessel 1000 also includes a labeling part 1050 that is configured to be positioned on the neck 1030. In some embodiments the labeling part 1050 is substantially flat and configured to be positioned on the shoulder 1020. In some embodiments, the labeling part 1050 is made from a pre-printed or blank substrate that is configured to be removably positioned on the neck 1030 and/or on the shoulder. In some embodiments, the labeling part 1050 is made from a substrate that is thermoformed to a shape, creased to form a shape or bend, or otherwise deforming for ease of identification. In some embodiments, the labeling part 1050 is disc-shaped. FIG. 10A shows the vessel 1000 together with a labeling part 1050 that is a disc sized and shaped to be passed over the neck 1030 of the vessel 1000 and to sit on the shoulder 1020 of the vessel 1000. FIG. 10B shows a top view of the labeling part 1050 removed from the vessel 1000, and showing a label 1060 describing the contents of the vessel 1000.

Referring back to FIG. 5, in some exemplary methods of use, a user uses the kit 500 to prepare the recipe 530 (e.g., for a beverage) by filling the vessel 510 sequentially with the ingredients of the recipe from the bottom of the vessel 510 to the top of the vessel 510, filling the vessel 510 with each ingredient to the one of the indicia 515 on the vessel that corresponds to the one of the indicia 535 of the recipe 530 denoting each ingredient, in accordance with sequential filling instructions included in the recipe 530. For example, referring to the specific recipe 530 shown in FIG. 5, the first indicia 540 indicates filling with a first ingredient up to nine (9) parts, so the user first fills the vessel 510 with the first ingredient up to the one of the indicia 515 indicating nine (9) parts. The second indicia 545 indicates filling with a second ingredient up to a total of eighteen (18) parts, so the user next fills the vessel 510 with the second ingredient up to the one of the indicia 515 indicating eighteen (18) parts, resulting in the vessel containing nine (9) parts of the first ingredient and nine (9) parts of the second ingredient. The third indicia 550 indicates filling with a third ingredient up to a total of twenty-one (21) parts, so the user next fills the vessel 510 with the third ingredient up to the one of the indicia 515 indicating twenty-one (21) parts, resulting in the vessel containing nine (9) parts of the first ingredient, nine (9) parts of the second ingredient, and three (3) parts of the third ingredient. The fourth indicia 555 indicates filling with a fourth ingredient up to a total of twenty-four (24) parts, so the user next fills the vessel 510 with the fourth ingredient up to the one of the indicia 515 indicating twenty-four (24) parts, resulting in the vessel containing nine (9) parts of the first ingredient, nine (9) parts of the second ingredient, three (3) parts of the third ingredient, and three (3) parts of the fourth ingredient. As discussed above, the vessel 510 may be of any size (with the indicia 515 each denoting equally sized portions thereof that vary depending on the size of the vessel 510), and the recipe 530 will be followed identically for any size of the vessel 510. For example, in a one-liter vessel 510 in which the indicia 515 denote parts that each contain 40 milliliters, the recipe 530 will contain 360 milliliters of the first ingredient; in a two-liter vessel 510 in which the indicia 515 denote parts that each contain 80 milliliters, the recipe 530 will contain 720 milliliters of the second ingredient; etc. Additionally, because the indicia 515 of the vessel 510 are used to measure ingredients, the user can make the recipe 530 (which, as discussed above, can refer to a variety of recipes for a variety of beverages or other mixtures) without needing to pre-measure separate ingredients before they are combined in the vessel 510. Further, because the indicia 515 of the vessel 510 are used to measure the ingredients input into the vessel 510, the user does not need to use or wash any other measuring devices (e.g., measuring spoons, measuring cups, etc.). Moreover, because the indicia 515 and 535 define dimensionless "parts," the user does not need to remember or refer to quantities with units associated therewith (e.g., ½ teaspoon, 2 tablespoons, 1½ ounces, 40 milliliters, ¾ cup, etc.), but, rather, only needs to bear dimensionless numbers in mind when making a recipe, thereby simplifying the measuring process.

In some embodiments, a vessel as described herein includes 2 parts. In some embodiments, a vessel as described herein includes 3 parts. In some embodiments, a vessel as described herein includes 4 parts. In some embodiments, a vessel as described herein includes 5 parts. In some embodiments, a vessel as described herein includes 6 parts. In some embodiments, a vessel as described herein includes 7 parts. In some embodiments, a vessel as described herein includes 8 parts. In some embodiments, a vessel as described herein includes 9 parts. In some embodiments, a vessel as described herein includes 10 parts. In some embodiments, a vessel as described herein includes 11 parts. In some embodiments, a vessel as described herein includes 12 parts. In some embodiments, a vessel as described herein includes 13 parts. In some embodiments, a vessel as described herein includes 14 parts. In some embodiments, a vessel as described herein includes 15 parts. In some embodiments, a vessel as described herein includes 16 parts. In some embodiments, a vessel as described herein includes 17 parts. In some embodiments, a vessel as described herein includes 18 parts. In some embodiments, a vessel as described herein includes 19 parts. In some embodiments, a vessel as described herein includes 20 parts. In some embodiments, a vessel as described herein includes 21 parts. In some embodiments, a vessel as described herein includes 22 parts. In some embodiments, a vessel as described herein includes 23 parts. In some embodiments, a vessel as described herein includes 24 parts. In some embodiments, a vessel as described herein includes 25 parts. In some embodiments, a vessel as described herein includes 26 parts. In some embodiments, a vessel as described herein includes 27 parts. In some embodiments, a vessel as described herein includes 28 parts. In some embodiments, a vessel as described herein includes 29 parts. In some embodiments, a vessel as described herein includes 30 parts. In some embodiments, a vessel as described herein includes 31 parts. In some embodiments, a vessel as described herein includes 32 parts. In some embodiments, a vessel as described herein includes 33 parts. In some embodiments, a vessel as described herein includes 34 parts. In some embodiments, a vessel as described herein includes 35 parts. In some embodiments, a vessel as described herein includes 36 parts. In some embodiments, a vessel as described herein includes 37 parts. In some embodiments, a vessel as described herein includes 38 parts. In some embodiments, a vessel as described herein includes 39 parts. In some embodiments, a vessel as described herein includes 40 parts. In some embodiments, a vessel as described herein includes 41 parts. In some embodiments, a vessel as described herein includes 42 parts. In some embodiments, a vessel as described herein includes 43 parts. In some embodiments, a vessel as described herein includes 44 parts. In some embodiments, a vessel as described herein includes 45 parts. In some embodiments, a vessel as described herein includes 46 parts. In some embodiments, a vessel as described herein includes 47 parts. In some embodiments, a vessel as described herein includes 48 parts. In some embodiments, a vessel as described herein includes 49 parts. In some embodiments, a vessel as described herein includes 50 parts. In some embodiments, a vessel as described herein includes 55 parts. In some embodiments, a vessel as described herein includes 60 parts. In some embodiments, a vessel as described herein includes 65 parts. In some embodiments, a vessel as described herein includes 70 parts. In some embodiments, a vessel as described herein includes 75 parts. In some embodiments, a vessel as described herein includes 79 parts. In some embodiments, a vessel as described herein includes 80 parts. In some embodiments, a vessel as described herein includes 85 parts. In some embodiments, a vessel as described herein includes 90 parts. In some embodiments, a vessel as described herein includes 95 parts. In some embodiments, a vessel as described herein includes 100 parts. In some embodiments, a vessel as described herein includes 110 parts. In some embodiments, a vessel as described herein includes 120 parts. In some embodiments, a vessel as described herein includes 125 parts. In some embodiments, a vessel as described herein includes 130 parts. In some embodiments, a vessel as described herein includes 140 parts. In some embodiments, a vessel as described herein includes 150 parts. In some embodiments, a vessel as described herein includes 160 parts. In some embodiments, a vessel as described herein includes 170 parts. In some embodiments, a vessel as described herein includes 175 parts. In some embodiments, a vessel as described herein includes 180 parts. In some embodiments, a vessel as described herein includes 190 parts. In some embodiments, a vessel as described herein includes 200 parts.

In some embodiments, a vessel as described herein includes between 2 and 25 parts. In some embodiments, a vessel as described herein includes between 2 and 50 parts. In some embodiments, a vessel as described herein includes between 2 and 75 parts. In some embodiments, a vessel as described herein includes between 2 and 100 parts. In some embodiments, a vessel as described herein includes between 2 and 125 parts. In some embodiments, a vessel as described herein includes between 2 and 150 parts. In some embodiments, a vessel as described herein includes between 2 and 175 parts. In some embodiments, a vessel as described herein includes between 2 and 200 parts. In some embodiments, a vessel as described herein includes between 25 and 50 parts. In some embodiments, a vessel as described herein includes between 25 and 75 parts. In some embodiments, a vessel as described herein includes between 25 and 100 parts. In some embodiments, a vessel as described herein includes between 25 and 125 parts. In some embodiments, a vessel as described herein includes between 25 and 150 parts. In some embodiments, a vessel as described herein includes between 25 and 175 parts. In some embodiments, a vessel as described herein includes between 25 and 200 parts. In some embodiments, a vessel as described herein includes between 50 and 75 parts. In some embodiments, a vessel as described herein includes between 50 and 100 parts. In some embodiments, a vessel as described herein includes between 50 and 125 parts. In some embodiments, a vessel as described herein includes between 50 and 150 parts. In some embodiments, a vessel as described herein includes between 50 and 175 parts. In some embodiments, a vessel as described herein includes between 50 and 200 parts. In some embodiments, a vessel as described herein includes between 75 and 100 parts. In some embodiments, a vessel as described herein includes between 75 and 125 parts. In some embodiments, a vessel as described herein includes between 75 and 150 parts. In some embodiments, a vessel as described herein includes between 75 and 175 parts. In some embodiments, a vessel as described herein includes between 75 and 200 parts. In some embodiments, a vessel as described herein includes between 100 and 125 parts. In some embodiments, a vessel as described herein includes between 100 and 150 parts. In some embodiments, a vessel as described herein includes between 100 and 175 parts. In some embodiments, a vessel as described herein includes between 100 and 200 parts. In some embodiments, a vessel as described herein includes between 125 and 150 parts. In some embodiments, a vessel as described herein includes between 125 and 175 parts. In some embodiments, a vessel as described herein includes between 125 and 200 parts. In some embodiments, a vessel as described herein includes between 150 and 175 parts. In some embodiments, a vessel as described herein includes between 150 and 200 parts. In some embodiments, a vessel as described herein includes between 175 and 200 parts.

In some embodiments, a vessel as described herein and including parts of a first size and parts of a different second size includes between 2 and 25 parts of the first size and between 2 and 25 parts of the second size. In some embodiments, a vessel as described herein and including parts of a first size and parts of a different second size includes between 2 and 50 parts of the first size and between 2 and 25 parts of the second size. In some embodiments, a vessel as described herein and including parts of a first size and parts of a different second size includes between 2 and 50 parts of the first size and between 2 and 50 parts of the second size. In some embodiments, a vessel as described herein and including parts of a first size and parts of a different second size includes between 2 and 75 parts of the first size and between 2 and 25 parts of the second size. In some embodiments, a vessel as described herein and including parts of a first size and parts of a different second size includes between 2 and 75 parts of the first size and between 2 and 50 parts of the second size. In some embodiments, a vessel as described herein and including parts of a first size and parts of a different second size includes between 2 and 75 parts of the first size and between 2 and 75 parts of the second size. In some embodiments, a vessel as described herein and including parts of a first size and parts of a different second size includes between 2 and 100 parts of the first size and between 2 and 25 parts of the second size. In some embodiments, a vessel as described herein and including parts of a first size and parts of a different second size includes between 2 and 100 parts of the first size and between 2 and 50 parts of the second size. In some embodiments, a vessel as described herein and including parts of a first size and parts of a different second size includes between 2 and 100 parts of the first size and between 2 and 75 parts of the second size. In some embodiments, a vessel as described herein and including parts of a first size and parts of a different second size includes between 2 and 100 parts of the first size and between 2 and 100 parts of the second size. In some embodiments, a vessel as described herein and including parts of a first size and parts of a different second size includes between 2 and 125 parts of the first size and between 2 and 25 parts of the second size. In some embodiments, a vessel as described herein and including parts of a first size and parts of a different second size includes between 2 and 125 parts of the first size and between 2 and 50 parts of the second size. In some embodiments, a vessel as described herein and including parts of a first size and parts of a different second size includes between 2 and 125 parts of the first size and between 2 and 75 parts of the second size. In some embodiments, a vessel as described herein and including parts of a first size and parts of a different second size includes between 2 and 150 parts of the first size and between 2 and 25 parts of the second size. In some embodiments, a vessel as described herein and including parts of a first size and parts of a different second size includes between 2 and 150 parts of the first size and between 2 and 50 parts of the second size. In some embodiments, a vessel as described herein and including parts of a first size and parts of a different second size includes between 2 and 175 parts of the first size and between 2 and 25 parts of the second size. In some embodiments, a vessel as described herein and including parts of a first size and parts of a different second size includes between 2 and 200 parts of the first size and between 2 and 200 parts of the second size.

In some embodiments, at least one part of a vessel as described herein has a volume that is 1 milliliter. In some embodiments, at least one part of a vessel as described herein has a volume that is 2 milliliters. In some embodiments, at least one part of a vessel as described herein has a volume that is 3 milliliters. In some embodiments, at least one part of a vessel as described herein has a volume that is 4 milliliters. In some embodiments, at least one part of a vessel as described herein has a volume that is 5 milliliters. In some embodiments, at least one part of a vessel as described herein has a volume that is 6 milliliters. In some embodiments, at least one part of a vessel as described herein has a volume that is 7 milliliters. In some embodiments, at least one part of a vessel as described herein has a volume that is 8 milliliters. In some embodiments, at least one part of a vessel as described herein has a volume that is 9 milliliters. In some embodiments, at least one part of a vessel as described herein has a volume that is 10 milliliters.

In some embodiments, at least one part of a vessel as described herein has a volume that is 15 milliliters. In some embodiments, at least one part of a vessel as described herein has a volume that is 20 milliliters. In some embodiments, at least one part of a vessel as described herein has a volume that is 25 milliliters. In some embodiments, at least one part of a vessel as described herein has a volume that is 30 milliliters. In some embodiments, at least one part of a vessel as described herein has a volume that is 35 milliliters. In some embodiments, at least one part of a vessel as described herein has a volume that is 40 milliliters. In some embodiments, at least one part of a vessel as described herein has a volume that is 45 milliliters. In some embodiments, at least one part of a vessel as described herein has a volume that is 50 milliliters. In some embodiments, at least one part of a vessel as described herein has a volume that is 55 milliliters. In some embodiments, at least one part of a vessel as described herein has a volume that is 60 milliliters. In some embodiments, at least one part of a vessel as described herein has a volume that is 65 milliliters. In some embodiments, at least one part of a vessel as described herein has a volume that is 70 milliliters. In some embodiments, at least one part of a vessel as described herein has a volume that is 75 milliliters. In some embodiments, at least one part of a vessel as described herein has a volume that is 80 milliliters. In some embodiments, at least one part of a vessel as described herein has a volume that is 85 milliliters. In some embodiments, at least one part of a vessel as described herein has a volume that is 90 milliliters. In some embodiments, at least one part of a vessel as described herein has a volume that is 95 milliliters. In some embodiments, at least one part of a vessel as described herein has a volume that is 100 milliliters. In some embodiments, at least one part of a vessel as described herein has a volume that is 150 milliliters. In some embodiments, at least one part of a vessel as described herein has a volume that is 200 milliliters. In some embodiments, at least one part of a vessel as described herein has a volume that is 300 milliliters. In some embodiments, at least one part of a vessel as described herein has a volume that is 400 milliliters. In some embodiments, at least one part of a vessel as described herein has a volume that is 500 milliliters.

In some embodiments, at least one part of a vessel as described herein has a volume that is ¼ teaspoon. In some embodiments, at least one part of a vessel as described herein has a volume that is ½ teaspoon. In some embodiments, at least one part of a vessel as described herein has a volume that is ¾ teaspoon. In some embodiments, at least one part of a vessel as described herein has a volume that is 1 teaspoon. In some embodiments, at least one part of a vessel as described herein has a volume that is ½ tablespoon. In some embodiments, at least one part of a vessel as described herein has a volume that is 1 tablespoon. In some embodiments, at least one part of a vessel as described herein has a volume that is ½ ounce. In some embodiments, at least one part of a vessel as described herein has a volume that is 1 ounce. In some embodiments, at least one part of a vessel as described herein has a volume that is 1½ ounces. In some embodiments, at least one part of a vessel as described herein has a volume that is 2 ounces. In some embodiments, at least one part of a vessel as described herein has a volume that is 2½ ounces. In some embodiments, at least one part of a vessel as described herein has a volume that is 3 ounces. In some embodiments, at least one part of a vessel as described herein has a volume that is 4 ounces. In some embodiments, at least one part of a vessel as described herein has a volume that is 6 ounces. In some embodiments, at least one part of a vessel as described herein has a volume that is 8 ounces. In some embodiments, at least one part of a vessel as described herein has a volume that is 10 ounces. In some embodiments, at least one part of a vessel as described herein has a volume that is 12 ounces. In some embodiments, at least one part of a vessel as described herein has a volume that is 1 pint. In some embodiments, at least one part of a vessel as described herein has a volume that is 20 ounces. In some embodiments, at least one part of a vessel as described herein has a volume that is 1 quart. In some embodiments, at least one part of a vessel as described herein has a volume that is 2 quarts. In some embodiments, at least one part of a vessel as described herein has a volume that is 1 gallon.

In some embodiments, at least one part of a vessel as described herein has a volume that is between 5 milliliters and 60 milliliters. In some embodiments, at least one part of a vessel as described herein has a volume that is between 60 milliliters and 200 milliliters. In some embodiments, at least one part of a vessel as described herein has a volume that is between 200 milliliters and 500 milliliters. In some embodiments, at least one part of a vessel as described herein has a volume that is between 5 milliliters and 200 milliliters. In some embodiments, at least one part of a vessel as described herein has a volume that is between 5 milliliters and 500 milliliters. In some embodiments, at least one part of a vessel as described herein has a volume that is between 60 milliliters and 500 milliliters. In some embodiments, at least one part of a vessel as described herein has a volume that is between ¼ teaspoon and 1 gallon. In some embodiments, at least one part of a vessel as described herein has a volume that is between ¼ teaspoon and 4 ounces. In some embodiments, at least one part of a vessel as described herein has a volume that is between ¼ teaspoon and 1 pint. In some embodiments, at least one part of a vessel as described herein has a volume that is between 4 ounces teaspoon and 1 gallon. In some embodiments, at least one part of a vessel as described herein has a volume that is between 4 ounces and 1 pint. In some embodiments, at least one part of a vessel as described herein has a volume that is between 1 pint and 1 gallon.

While a number of embodiments of the present invention have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

What is claimed is:

1. A kit, comprising:
a plurality of different sized mixing vessels, each including:
a filling opening configured to allow each mixing vessel to be filled therethrough when each mixing vessel is oriented in a filling orientation; and
a plurality of indicia disposed on each mixing vessel, wherein the plurality of indicia are positioned and spaced so as to define a plurality of parts of the mixing vessel therebetween when viewed while each mixing vessel is oriented in the filling orientation, and wherein the plurality of indicia are sequentially labeled, wherein at least some of the plurality of indicia for each mixing vessel are the same but correspond to different volumes for each mixing vessel while representing the same relative ratio of a partial volume to a whole volume of each mixing vessel; and
a recipe including an identification of a plurality of ingredients and sequential filling instructions for adding the plurality of ingredients of the recipe to any of the mixing vessels in a sequential manner, wherein each sequential filling instruction has a corresponding one of the plurality of ingredients, and wherein each sequential filling instruction indicates a labeled indicia on each mixing vessel corresponding to a fill level of contents of each mixing vessel following addition of the corresponding one of the plurality of ingredients.

2. The kit of claim 1, wherein the plurality of parts of each mixing vessel are uniformly sized.

3. The kit of claim 2, wherein each mixing vessel includes between 2 and 200 parts.

4. The kit of claim 1, wherein the plurality of parts of each mixing vessel are non-uniformly sized.

5. The kit of claim 4, wherein the first plurality of the parts of one mixing vessel includes between 2 and 200 of the parts of the one mixing vessel having the first size, and wherein the second plurality of the parts of the second mixing vessel includes between 2 and 200 of the parts of the second mixing vessel having the second size.

6. The kit of claim 1, wherein each mixing vessel is configured to dispense contents thereof when each mixing vessel is positioned in a dispensing orientation that is different from the filling orientation.

7. The kit of claim 6, wherein the filling opening is oriented on a top of each mixing vessel when each mixing vessel is positioned in the filling orientation, and wherein the filling opening is oriented on a side of each mixing vessel when each mixing vessel is positioned in the dispensing orientation.

8. The kit of claim 1, wherein the recipe is a recipe for one of a beverage, a sauce, a marinade, a spice mixture, or a powdered drink mixture.

9. The kit of claim 1, wherein each mixing vessel is one of an open-topped bottle, a closable bottle, a pitcher, a glass, a cup, a measuring cup, or a bowl.

10. The kit of claim 1, wherein at least one of the parts of each mixing vessel has a volume that is between 5 milliliters and 500 milliliters.

11. The kit of claim 1, wherein the recipe is included in a reference guide comprising a plurality of recipes.

12. The kit of claim 11, wherein the reference guide comprises a computerized reference guide.

13. The kit of claim 11, wherein the reference guide comprises a physical item.

14. The kit of claim 13, wherein the physical item includes at least one blank user-fillable recipe template.

15. The kit of claim 13, wherein the physical item includes a material that is selected to prevent damage if the physical item becomes wet.

16. A method, comprising:
providing a plurality of different sized mixing vessels, each including:
an opening configured to allow each mixing vessel to be filled therethrough each the mixing vessel is oriented in a filling orientation; and
a plurality of indicia disposed on each mixing vessel, wherein the plurality of indicia are positioned and spaced so as to define a plurality of parts of each mixing vessel therebetween when viewed while each mixing vessel is oriented in the filling orientation, and wherein the plurality of indicia are sequentially labeled, wherein at least some of the plurality of indicia for each mixing vessel are the same but correspond to different volumes for each mixing vessel while representing the same relative ratio of a partial volume to a whole volume of each mixing vessel;

providing a recipe, including an identification of a plurality of ingredients and sequential filling instructions for adding the plurality of ingredients of the recipe to any of the mixing vessels in a sequential manner, wherein each sequential filling instruction has a corresponding one of the plurality of ingredients, and wherein each filling instruction indicates a labeled indicia on each mixing vessel corresponding to a fill level of contents of the mixing vessel following addition of the corresponding one of the plurality of ingredients;

orienting each mixing vessel in the filling orientation;

adding an amount of a first one of the plurality of ingredients to each mixing vessel until each mixing vessel is filled to the labeled indicia indicated by a first one of the sequential filling instructions that corresponds to the first one of the plurality of ingredients; and adding an amount of a second one of the plurality of ingredients to each mixing vessel until each mixing vessel is filled to the labeled indicia indicated by a second one of the sequential filling instructions that corresponds to the second one of the plurality of ingredients.

17. The method of claim 16, further comprising:

orienting each mixing vessel in a dispensing orientation that is different from the filling orientation; and dispensing contents of each mixing vessel from each mixing vessel in the dispensing orientation.

18. The method of claim 16, wherein at least one of the plurality of ingredients is a liquid.

19. The method of claim 16, wherein at least one of the plurality of ingredients is a solid.

20. The method of claim 19, wherein the solid is ice.

21. The method of claim 16, wherein at least one of the plurality of ingredients is a powder.

* * * * *